(12) United States Patent
Xu et al.

(10) Patent No.: US 11,635,157 B2
(45) Date of Patent: Apr. 25, 2023

(54) NON-METALLIC FLEXIBLE PIPE AND MANUFACTURING METHOD THEREOF

(71) Applicants: CHINA MERCHANTS HEAVY INDUSTRY (JIANGSU) CO., LTD., Jiangsu (CN); China University of Petroleum-Beijing, Beijing (CN)

(72) Inventors: Lixin Xu, Jiangsu (CN); Chuanbo Cong, Beijing (CN); Hui Cao, Beijing (CN); Xiaoyu Meng, Beijing (CN); Qinjing Guo, Jiangsu (CN); Qiong Zhou, Beijing (CN)

(73) Assignees: CHINA MERCHANTS HEAVY INDUSTRY (JIANGSU) CO., LTD., Jiangsu (CN); China University of Petroleum-Beijing, Beijing (CN)

( * ) Notice: Subject to any disclaimer, the term of this patent is extended or adjusted under 35 U.S.C. 154(b) by 450 days.

(21) Appl. No.: 16/971,677

(22) PCT Filed: Apr. 23, 2019

(86) PCT No.: PCT/CN2019/083893
§ 371 (c)(1),
(2) Date: Aug. 20, 2020

(87) PCT Pub. No.: WO2019/192624
PCT Pub. Date: Oct. 10, 2019

(65) Prior Publication Data
US 2020/0408337 A1    Dec. 31, 2020

(30) Foreign Application Priority Data

Apr. 4, 2018   (CN) .......................... 201810301037.6

(51) Int. Cl.
| | | |
|---|---|---|
| *F16L 11/08* | (2006.01) | |
| *B29D 23/00* | (2006.01) | |
| *B29K 101/12* | (2006.01) | |

(52) U.S. Cl.
CPC .......... *F16L 11/087* (2013.01); *B29D 23/001* (2013.01); *B29K 2101/12* (2013.01)

(58) Field of Classification Search
CPC ............................... F16L 11/08; F16L 11/087
(Continued)

(56) References Cited

U.S. PATENT DOCUMENTS 5,908,049 A * 6/1999 Williams .............. E21B 17/206
                                                        138/132
5,921,285 A * 7/1999 Quigley .................... F16L 9/19
                                                        138/123
(Continued)

FOREIGN PATENT DOCUMENTS

| CN | 102927383 | 2/2013 |
|---|---|---|
| CN | 106287027 | 1/2017 |

(Continued)

OTHER PUBLICATIONS

"International Search Report (Form PCT/ISA/210) of PCT/CN2019/083893", dated Jul. 22, 2019, with English translation thereof, pp. 1-4.

*Primary Examiner* — Patrick F Brinson
(74) *Attorney, Agent, or Firm* — JCIP Global Inc.

(57) ABSTRACT

A nonmetallic flexible pipe and a manufacturing method thereof. The nonmetallic flexible pipe comprises, from the inside to the outside, an inner liner, a pressure bearing layer, an isolation layer, a tensile layer, a functional layer, and a protective layer, wherein two adjacent layers are non-rigidly bonded. The inner liner layer is made from a thermoplastic polymer. The pressure bearing layer is made from a fiber-reinforced resin-based composite material. The isolation layer is made from a thermoplastic polymer. The tensile layer is made from a resin-reinforced fiber material. At least (Continued)

one of an optical fiber, a cable, a tracing ribbon, a pipe for conveying a heat transfer medium, a pressure sensor, and a temperature sensor is provided in the functional layer. The protective layer is made from a thermoplastic polymer.

20 Claims, 2 Drawing Sheets

(58) Field of Classification Search
USPC .................................. 138/125, 137, 140
See application file for complete search history.

(56) References Cited

U.S. PATENT DOCUMENTS

| | | | | |
|---|---|---|---|---|
| 6,016,845 | A * | 1/2000 | Quigley | F16L 9/125 138/144 |
| 6,085,798 | A * | 7/2000 | Le Nouveau | F16L 11/16 138/125 |
| 6,296,066 | B1 * | 10/2001 | Terry | E21B 17/206 175/320 |
| 8,678,042 | B2 * | 3/2014 | Quigley | F16L 11/085 138/123 |
| 2013/0269819 | A1 * | 10/2013 | Ruby | B29C 48/287 156/172 |
| 2014/0326357 | A1 * | 11/2014 | Graham | F16L 11/088 156/187 |
| 2015/0027580 | A1 * | 1/2015 | Glejbol | B32B 5/26 428/128 |
| 2015/0136264 | A1 * | 5/2015 | Holland | E21B 47/01 138/104 |
| 2015/0240971 | A1 * | 8/2015 | Procida | B32B 15/082 138/134 |
| 2016/0089846 | A1 | 3/2016 | McCartney et al. | |

FOREIGN PATENT DOCUMENTS

| | | |
|---|---|---|
| CN | 106979391 | 7/2017 |
| CN | 108527807 | 9/2018 |

* cited by examiner

NON-METALLIC FLEXIBLE PIPE AND MANUFACTURING METHOD THEREOF

CROSS-REFERENCE TO RELATED APPLICATION

This application is a 371 of international application of PCT application Ser No. PCT/CN2019/083893, filed on Apr. 23, 2019, which claims the priority benefit of China application No. 201810301037.6, filed on Apr. 4, 2018. The entirety of each of the above mentioned patent applications is hereby incorporated by reference herein and made a part of this specification.

BACKGROUND

Technical Field

The present invention relates to a non-metallic flexible pipe and a manufacturing method thereof, and more particularly to a multi-purpose non-metallic flexible pipe for marine risers, deep-sea pipelines, etc. and a manufacturing process.

Description of Related Art

Deep-sea pipelines, as the "lifeline" of the marine oil and gas production system, are currently the fastest, safest, and most economical and reliable way of offshore oil and gas transportation and play a significant role in the development of submarine oil and natural gas exploitation. However, the deep sea pipelines face a harsh environment in working condition; the combined effect of high temperature, high pressure, hydrogen sulfide, and carbon dioxide inside the pipelines can lead to deterioration of material performance. Compared to the deep-sea pipelines, marine risers face a harsher working condition. In addition to the above factors, they also have to withstand the combined effect of hydrostatic pressure, bending moment, and axial tension. Therefore, the safety of submarine pipelines has been greatly threatened due to the dual effect of harsh environments and complicated fluid delivery.

The deep-sea pipelines and marine risers could include metal pipes and non-metallic pipes. Metal pipelines have difficult laying and maintaining, and are more easily corroded in a complex fluid environment. Non-metallic flexible pipes are made of a variety of polymer materials and have the advantages such as light weight, resistance to multiple corrosive fluids, wear resistance, and low laying cost. Therefore, non-metal flexible pipes are preferred. At present, the mainstream non-metallic flexible pipe is an adhesive flexible pipe, which is generally composed of multiple layers of materials, and the adjacent layers of materials are mostly connected by rigid bonding to form a bonded composite pipe structure. For example, the adhesive non-metallic flexible pipe disclosed in patent CN106287027A sequentially comprises, from the inside to the outside, an inner liner, a reinforcement layer, a functional layer, and a protective layer, wherein the inner liner and the reinforcement layer are welded to ensure the corrosion resistance and gas permeability resistance of the inner liner and the flexibility of the pipe. In addition, the main improvement is that the three-layer structure of the inner liner forms a bonded stone wall structure, which further improves the above properties of the inner liner.

However, studies have found that the above-mentioned bonded flexible pipe, when used in a marine environment, is easily cracked under stress and has poor temperature resistance, which makes it unable to adapt to the harsh environment in the ocean and causes security issues.

SUMMARY

In response to the above defects in prior art, the present invention provides a non-metallic flexible pipe and a manufacture method thereof. This non-metallic flexible pipe not only has good corrosion resistance, gas permeability resistance and flexibility, but also has good temperature and pressure resistance, and can adapt to the harsh working conditions in the ocean.

In order to achieve the above object, the present invention firstly provides a non-metallic flexible pipe, sequentially comprising, from the inside to the outside, an inner liner, a pressure-bearing layer, an isolation layer, a tensile layer, a functional layer, and a protective layer, with non-rigid bonding being between two adjacent layers.

The material of the inner liner is a thermoplastic polymer, the material of the pressure-bearing layer is a fiber-reinforced resin-based composite, the material of the isolation layer is a thermoplastic polymer, the material of the tensile layer is a resin-reinforced fiber, at least one of an optical fiber, a cable, a tracing ribbon, a pipe for conveying a heat transfer medium, a pressure sensor, and a temperature sensor is provided in the functional layer, and the material of the protective layer is a thermoplastic polymer.

The non-rigid bonding described in the present invention is a concept opposite to the current "rigid bonding", and refers to flexible bonding formed by physical adsorption, mortise and tenon interaction, inlay bonding, etc.

Specifically, the material used for the inner liner can be reasonably selected according to the actual conditions such as the corrosion characteristics, temperature, pressure, and wear performance of the conveyed medium, and in particular, an engineering thermoplastic that maintains stable performance in conveying the medium and has good barrier property for the conveyed medium can be chosen, and includes, but not limited to, one or more of polyethylene, nylon, polybutylene terephthalate, polyketone, polyphenylene sulfide, polyether ether ketone, polyvinylidene fluoride, thermoplastic polyurethane, perfluoroalkoxy, and polyphenylene ether.

In the specific implementation process of the present invention, particles of the one or more thermoplastic polymers described above are melt-extruded, and subjected to shaping treatment during the extrusion process. For example, the material is formed through a die in a flowing state by heating and pressing in the extruder, and then cooled and shaped to obtain a thermoplastic polymer inner lining tube with a required diameter and length, which is the inner liner.

Generally, the inner liner is a single-layer structure, and its thickness can be controlled within a range of 1-20 mm, so that it can not only maintain good corrosion resistance, but also facilitate the bending and coiling of the non-metallic flexible pipe.

It can be understood that the size of the inner liner determines the inner diameter of the non-metallic flexible pipe. Generally, the size of the inner liner can be set reasonably according to the actual application environment of the non-metallic flexible pipe. Typically, the inner diameter of the non-metallic flexible pipe can reach 2-20 inches.

As the name implies, the pressure-bearing layer functions to withstand external and internal pressures, and has a relatively large deformability when the entire pipe is bent. In an embodiment of the present invention, the material of the pressure-bearing layer is a fiber-reinforced resin-based composite, namely, a fiber-reinforced polymer (FRP), which uses a resin as a matrix and a fiber as a dispersion. The fiber can specifically be one of carbon fiber, glass fiber, aramid fiber, nylon fiber, polybenzimidazole fiber (PBI), polyimide fiber (PI), polysulfone amide fiber (PSA), and polyethylene terephthalate fiber (PET), or a blended fiber thereof, and the resin is one of epoxy resin, unsaturated polyester resin, poly (phthalazinone ether sulfone ketone) containing biphenyl moieties (PPBESK), poly (p-phenylene benzobisoxazole) (PBO), and polyimide, or a mixture thereof. Of course, the pressure-bearing layer can also be a composite of other fibers and resins, such as a nylon fiber-reinforced epoxy resin-based composite, a glass fiber-reinforced epoxy resin-based composite, a carbon fiber-reinforced polyimide resin-based composite etc.

Specifically, the pressure-bearing layer may be formed by at least one pair of pressure-bearing belts being wrapped on the inner liner successively and extending along the axial direction of the inner liner.

In each pair of pressure-bearing belts, the inner surface of the later wrapped pressure-bearing belt covers the outer surface of the first wrapped pressure-bearing belt, and an interlocking structure is formed between the two surfaces, so that relative displacements do not occur between the two bearing belts in the axial direction.

Each pressure-bearing belt is wrapped on the surface of the inner liner at an angle of 20 degrees to 60 degrees, for example, at an angle of 30 degrees.

Specifically, in order to realize the above-mentioned interlocking structure, in each pair of pressure-bearing belts, the pressure-bearing belts wrapped successively are staggered, with inlaid connection being between the two surfaces that contact each other.

For example, the outer surface of the first wrapped pressure-bearing belt and the inner surface of the later wrapped pressure-bearing belt can be respectively provided with a concave-convex structure that can cooperate with each other, so that an inlaid structure is formed between the outer surface of the first wrapped pressure-bearing belt and the inner surface of the later wrapped pressure-bearing belt, forming an interlocking structure. Moreover, each turn of the later wrapped pressure-bearing belt covers at least the surfaces of two turns of the first wrapped pressure-bearing belt, and an inlaid structure is formed between each turn of the first wrapped pressure-bearing belt and at least two turns of the later wrapped pressure-bearing belt. Namely, the two pressure-bearing belts of each pair are alternately provided, to further ensure that no relative displacement in the two pressure-bearing belts occurs in the axial direction.

Figure 1:
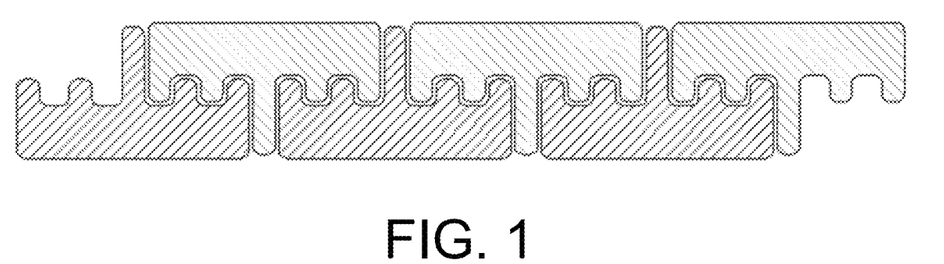
FIG. 1 is a first schematic diagram showing an interlocking manner of pressure-bearing belts according to an embodiment of the present invention.
Figure 2:
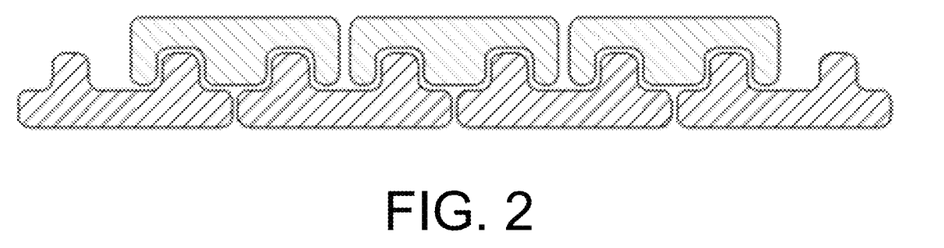
FIG. 2 is a second schematic diagram showing an interlocking manner of pressure-bearing belts according to an embodiment of the present invention.
Figure 3:
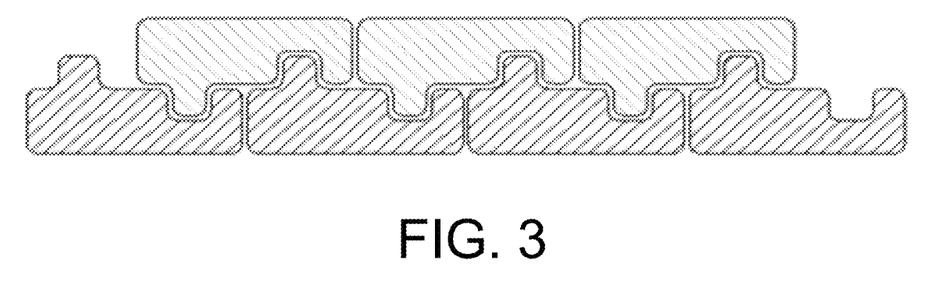
FIG. 3 is a third schematic diagram showing an interlocking manner of pressure-bearing belts according to an embodiment of the present invention.

In the specific implementation process of the present invention, an inlaid structure is formed between each turn of the later wrapped pressure-bearing belt and two turns of the first wrapped pressure-bearing belt, and also between each turn of the first wrapped pressure-bearing belt and two turns of the later wrapped pressure-bearing belt. The inlaid structure may be an interlocking structure commonly used in the art, such as a double T-type, a TTM-type, a CT-type, etc., as schematically shown in FIGS. 1 to 3, respectively. In this way, when the entire pipe is deformed, the pressure-bearing belts can be relatively displaced to a certain degree, so that the entire pipe has a certain degree of flexibility, and the entire wrapped structure can withstand external hydrostatic pressure.

The pressure-bearing belt used in the non-metallic flexible pipe can be manufactured from the fiber-reinforced resin-based composite into a strip-shaped material with the above-mentioned concave-convex structure on one surface, with a width of generally 10-100 mm and a thickness of generally 1-20 mm. Then, the pressure-bearing belts are wrapped sequentially on the surface of the inner liner to obtain the pressure-bearing layer.

In the specific implementation process of the present invention, the pressure-bearing belt is obtained by twisting a fiber into a bundle, extruding and impregnating the obtained bundle with a resin, and curing the impregnating resin.

In the manufacturing process of the above pressure-bearing belt, the fibers are twisted into bundles to increase the cohesion between individual fibers, to avoid breakage or derangement in the subsequent processing, and to increase the breaking strength of the fibers. Then, the fiber bundles are formed by heating and pressing in an extruder, continuously through a die, and grooves and/or protrusions are formed in the process. And then, through a shaping die to draw and maintain the traction tension, the fiber bundles are impregnated with the resin to reach saturation, and finally the resin is thermally cured or photocured to obtain the pressure-bearing belt.

It can be understood that the more the number of layers of the pressure-bearing belts, the higher the pressure bearing capacity. However, the deformation capacity of the entire pipe is constrained correspondingly. According to different pipe diameters and pressure-bearing requirements, 1-10 layers of pressure-bearing belts, that is, 1-5 pairs of pressure-bearing belts, are generally provided, with a final thickness of the entire pressure-bearing layer of 2-30 mm. The manufacturing and wrapping methods of each pair of pressure-bearing belts are the same as above, and will not be described again.

The main function of the isolation layer is to prevent mutual wear between the pressure-bearing layer and the tensile layer. Specifically, an engineering thermoplastic can be used for the isolation layer, and the material of the isolation layer can be the same as or different from that of the inner liner. In general, the thickness of the isolation layer is 1-20 mm.

The material of the tensile layer is a resin-reinforced fiber, which can specifically be a single-layer structure or a multilayer structure with non-rigid bonding.

Specifically, the resin-reinforced fiber is a fiber meshed layer after dipping and curing. In the specific implementation process of the present invention, a fiber cloth is woven outside the isolation layer and impregnated with a resin, and then the resin is cured to obtain a resin-reinforced fiber material.

The thickness of the tensile layer is generally 1-25 mm, which specifically can be a single-layer structure or a multi-layer structure, such as 1-5 layers. The manufacturing method of each layer is the same as above, and will not be described again. In addition, in order to avoid adhesion between two adjacent layers, in the bending deformation of the whole pipe, a certain relative displacement may occur between two adjacent layers of the tensile layer, or a lining paper can be added between the two adjacent layers.

In the resin-reinforced fiber of the tensile layer, the fiber can specifically be at least one of carbon fiber, glass fiber, aramid fiber, nylon fiber, polybenzimidazole fiber, polyimide fiber, polysulfone amide fiber, and polyethylene terephthalate fiber, and the resin can be one or more of epoxy resin, unsaturated polyester resin, poly (phthalazinone ether sulfone ketone) containing biphenyl moieties, poly (p-phenylene benzobisoxazole), and polyimide.

In the specific implementation process of the present invention, a isolation layer and a tensile layer disposed adjacent to each other are set as a group, and 1-3 groups of the isolation layer and the tensile layer are disposed between the pressure-bearing layer and the functional layer. Namely, the isolation layer and the tensile layer are combined into a repeating unit, and the repeating unit is repeated 1-3 times to form an "inner liner-pressure-bearing layer-isolation layer-tensile layer-isolation layer-tensile layer . . . functional layer-protective layer" structure.

The protective layer is used to protect the entire non-metallic flexible pipe, which is generally a single-layer structure, with a thickness being usually controlled within 1-20 mm. Generally, the material of the protective layer can also be an engineering thermoplastic. According to different working conditions, one of polyethylene (PE), polyamide (PA), polybutylene terephthalate (PBT), polyketone (POK), polyphenylene sulfide (PPS), polyether ether ketone (PEEK), polyvinylidene fluoride (PVDF), thermoplastic polyurethane (TPU), polyfluoro (PF), and polyphenylene ether (PPO), or a blend thereof can be selected.

In the specific implementation process of the present invention, the protective layer can also be made by melt-extrusion. First, the molten polymer is extruded onto the functional layer, and then subjected to shaping and cooling to complete the coating of the protective layer. Finally, a finished product can be obtained after pipe collection.

The material and structure of the non-metallic flexible pipe provided by the present invention ensure that the non-metallic flexible pipe has light weight, corrosion resistance, gas permeability resistance, and certain flexibility, and also good elasticity and fatigue resistance. The present inventor has also found that the non-metallic flexible pipe has outstanding temperature and pressure resistance, and withstands a greater degree of an axial load, and can adapt to the harsh working conditions in the ocean.

Still another aspect of the present invention provides a method for manufacturing the above-mentioned non-metallic flexible pipe, comprising the following steps:

(1) a thermoplastic polymer is melt-extruded, and shaped and cooled to obtain an inner lining pipe with a preset size, namely, the inner liner;

(2) two pressure-bearing belts made of a fiber-reinforced resin-based composite are wrapped on the surface of the inner lining pipe successively and extend along the axial direction of the inner lining pipe to form the pressure-bearing layer;

(3) a thermoplastic polymer is melt-extruded and wrapped on the surface of the pressure-bearing layer, and then shaped and cooled to form the isolation layer;

(4) fibers are woven onto the surface of the isolation layer, so that the woven fiber cloth is coated on the surface of the isolation layer; the fiber cloth is impregnated with or coated with a resin, and the resin is cured to form the tensile layer;

(5) at least one of an optical fiber, a cable, a tracing ribbon, a pipe for conveying a heat transfer medium, a pressure sensor, and a temperature sensor is wrapped on the surface of the tensile layer to obtain the functional layer; and (6) a thermoplastic polymer is extruded outside the functional layer, and shaped and cooled to complete the coating of the protective layer.

Specifically, the above step (2) can be carried out 1-5 times, wherein the pressure-bearing belt is obtained by twisting fibers into bundles, extruding and impregnating with a resin, and curing the impregnating resin.

Specifically, the above step (2) can be carried out at least once, generally 1-5 times.

Before performing step (5), the above steps (3) and (4) can be alternately carried out 1-4 times, so as to form 1-3 groups of alternating isolation layers and tensile layers between the pressure-bearing layer and the functional layer.

The non-metallic flexible pipe provided by the present invention not only has good corrosion resistance, gas permeability resistance and flexibility, but also can withstand a high temperature of 80° C. or even 180° C. and higher and a pressure of 15 MPa or even 50 MPa or more, and its non-destructive axial tension is not less than 300 kN, or even up to 700 kN or more. Therefore, the non-metallic flexible pipe has good temperature and pressure resistance, and can withstand a large degree of an axial load, so that it can adapt to the harsh working conditions in the ocean, and can be used normally in a water depth of 500 meters or deeper or even 3000 meters. Thus, it can be well applied to marine risers and submarine pipelines, etc. in the exploitation of oil, natural gas, marine mineral resources, and combustible ice.

Moreover, the non-metallic flexible pipe has a wide range of raw materials and can be flexibly configured according to actual demands.

The manufacturing method of the non-metallic flexible pipe provided by the present invention has simple and feasible steps, and is convenient for large-scale promotion and application.

Description of the reference numerals: 1—inner liner; 2—pressure-bearing layer; 3—isolation layer; 4—tensile layer; 5—functional layer; 6—protective layer.

DESCRIPTION OF THE EMBODIMENTS

In order to make the objectives, technical solutions, and advantages of embodiments of the present invention clearer, the technical solutions in the embodiments of the present invention are clearly and fully described below with reference to the accompanying drawings in the embodiments of the present invention. It is clear that the described embodiments are part of embodiments of the present invention rather than all the embodiments of the present invention. All other embodiments, obtained by those of ordinary skill in the art based on the embodiments of the present invention without creative efforts, shall fall within the protection scope of the present invention. Without conflicts, the following embodiments and features in the embodiments can be combined with each other.

The non-metallic flexible pipes manufactured in the following examples all are tested and characterized with reference to the API RP 17B-2008 standard and the API SPEC 17J-2014 standard for the test practice of unbonded flexible pipes. The main test includes the standard prototype test, such as burst test, crush test, axial tensile test, and temperature test.

Example 1

Figure 4:
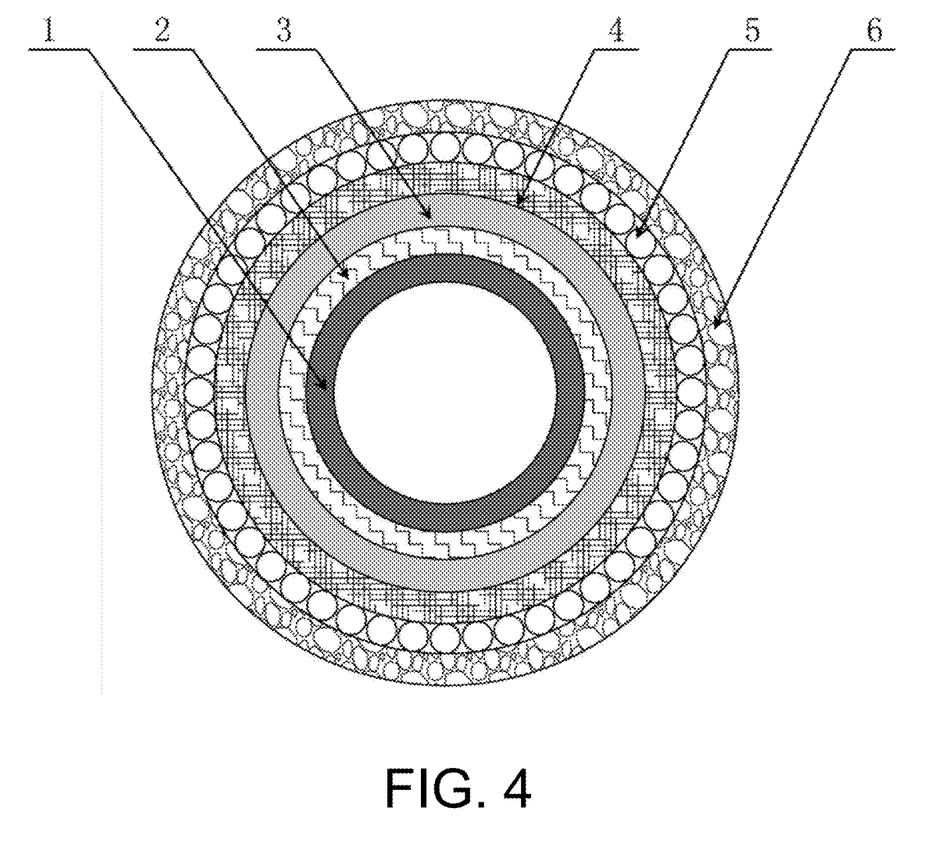
FIG. 4 is a schematic diagram of the radial cross-section of a non-metallic flexible pipe according to an embodiment of the present invention.

This example provides a non-metallic flexible pipe with an inner diameter of 16 inches, as shown in FIG. 4, sequentially comprising, from the inside to the outside, an inner liner 1, a pressure-bearing layer 2, an isolation layer 3, a tensile layer 4, a functional layer 5, and a protective layer 6. The manufacturing process sequentially includes the following steps:

1. Polyethylene is extruded by an extruder, and shaped and cooled to obtain a PE pipe as the inner liner 1. The extrusion process conditions are as follows: an extrusion thickness of 5 mm and an extrusion temperature of 140-190° C.

2. Nylon fibers are twisted, passed through a die of a pressure-bearing belt, and then immersed in epoxy resin. After excess epoxy resin is removed by a scraper, the epoxy resin is cured by heating with hot air to 120° C. to form a pressure-bearing belt. The pressure-bearing belt has a thickness of 5 mm and a width of 40 mm, and a concave-convex structure on one surface.

Through a wrapping machine, a pressure-bearing belt is tiled onto the extruded PE pipe at 30° with the surface having a concave-convex structure facing outward. Then, a second pressure-bearing belt is wrapped with the surface having a concave-convex structure facing inward and engaging with the corresponding surface of the wrapped first pressure-bearing belt, so that the two pressure-bearing belts form an interlocking structure, as shown in FIG. 1, which is a double T-type interlocking structure, thereby completing the preparation of the pressure-bearing layer 2.

3. PE is extruded outside the wrapped pressure-bearing layer 2 by an extruder using the same process as the extrusion of the inner liner, and shaping and cooling are performed to complete the coating of the isolation layer 3, with a thickness of 3 mm.

4. After nylon fibers are twisted into threads, a nylon cloth is weaved outside the isolation layer 3 by a braiding machine. The nylon cloth is immersed in epoxy resin, and heat cured to bond into a whole, to improve the internal pressure resistance of the nylon cloth, thereby completing the preparation of the tensile layer 4, with a thickness of 4 mm.

5. An optical fiber, a cable, and a pressure sensor are wrapped outside the tensile layer to form the functional layer 5.

6. Thermoplastic polyurethane is extruded through an extruder and coated outside the functional layer 5. Shaping and cooling are performed to complete the processing of the protective layer 6, with a thickness of 4 mm. Finally, pipe collection is carried out by a pipe collecting machine to obtain a finished product.

The non-metallic flexible pipe manufactured in this example can be equivalent to a thick-walled pipe composed of different layers, and according to the stress analysis, the maximum allowable internal pressure of the non-metallic flexible pipe is 40 MPa, and the maximum allowable external pressure is 6 MPa.

The non-metallic flexible pipe can be coiled and its non-destructive axial tension is 300 kN. The flexible pipe can be useful for marine risers and submarine pipelines for oil and gas gathering and transportation under the conditions of the maximum pressure of 15 MPa, a temperature of 80° C., and a water depth of 300 m.

Example 2

This example provides a non-metallic flexible pipe with an inner diameter of 12 inches, sequentially comprising, from the inside to the outside, an inner liner 1, a pressure-bearing layer 2, an isolation layer 3, a tensile layer 4, an isolation layer 3, a tensile layer 4, a functional layer 5, and a protective layer 6. The manufacturing process sequentially includes the following steps:

1. Ultra high molecular weight polyethylene (UHMWPE, unbranched linear polyethylene with a molecular weight of 1.5 million or more) is extruded by an extruder, and shaped and cooled to obtain an UHMWPE pipe as the inner liner 1. The extrusion process conditions are as follows: an extrusion thickness of 7 mm and an extrusion temperature of 320° C.

2. Glass fibers are twisted, passed through a die of a pressure-bearing belt, and then immersed in epoxy resin. After excess epoxy resin is removed by a scraper, the epoxy resin is cured by heating with hot air to 120° C. to form a pressure-bearing belt. The pressure-bearing belt has a thickness of 7 mm and a width of 40 mm, and a concave-convex structure on one surface.

Through a wrapping machine, a pressure-bearing belt is tiled onto the extruded UHMWPE pipe at 30° with the surface having a concave-convex structure facing outward. Then, a second pressure-bearing belt is engaged, with the surface having a concave-convex structure facing inward, with the wrapped first pressure-bearing belt, so that the two pressure-bearing belts form an interlocking structure, as shown in FIG. 2, which is a TTM-type interlocking structure, thereby completing the preparation of the pressure-bearing layer 2.

3. Polybutylene terephthalate (PBT) is extruded outside the wrapped pressure-bearing layer 2 by an extruder using the same process as the extrusion of the inner liner, and shaping and cooling are performed to complete the coating of the first isolation layer 3, with a thickness of 3 mm.

4. After aramid fibers are twisted, an aramid cloth is weaved outside the isolation layer 3 by a braiding machine. The aramid cloth is immersed in phenolic epoxy resin, and heat cured to bond into a whole, to improve the internal pressure resistance of the aramid cloth, thereby completing the preparation of the first tensile layer 4, with a thickness of 6 mm.

5. PBT is extruded outside the cured first tensile layer 4 by an extruder using the same process as the extrusion of the inner liner, and shaping and cooling are performed to complete the coating of the second isolation layer 3, with a thickness of 3 mm.

6. After aramid fibers are twisted, an aramid cloth is weaved outside the second isolation layer 3 by a braiding machine. The aramid cloth is immersed in phenolic epoxy resin, and heat cured to bond into a whole, to improve the internal pressure resistance of the aramid cloth, thereby completing the preparation of the second tensile layer 4, with a thickness of 6 mm.

7. An optical fiber, a cable, and a pressure sensor are wrapped outside the second tensile layer 4 to form the functional layer 5.

8. Thermoplastic polyurethane is extruded through an extruder and coated outside the functional layer 5. Shaping and cooling are performed to complete the processing of the protective layer 6, with a thickness of 6 mm. Finally, pipe collection is carried out by a pipe collecting machine to obtain a finished product.

The non-metallic flexible pipe manufactured in this example can be equivalent to a thick-walled pipe composed of different layers, and according to the stress analysis, the maximum allowable internal pressure of the non-metallic flexible pipe is 40 MPa, and the maximum allowable external pressure is 6 MPa.

The non-metallic flexible pipe can be coiled and its non-destructive axial tension is 400 kN. The flexible pipe is useful for marine risers and submarine pipelines for oil and gas gathering and transportation under the conditions of the maximum pressure of 35 MPa, a temperature of 100° C., and a water depth of 500 m.

Example 3

This example provides a non-metallic flexible pipe with an inner diameter of 10 inches, sequentially comprising, from the inside to the outside, an inner liner 1, a pressure-bearing layer 2, an isolation layer 3, a tensile layer 4, an isolation layer 3, a tensile layer 4, a functional layer 5, and a protective layer 6. The manufacturing process sequentially includes the following steps:

1. Polyvinylidene fluoride (PVDF) is extruded by an extruder, and shaped and cooled to obtain a PVDF pipe as the inner liner 1. The extrusion process conditions are as follows: an extrusion thickness of 10 mm and an extrusion temperature of 180-230° C.

2. Carbon fibers are twisted, passed through a die of a pressure-bearing belt, and then immersed in polyimide (PI). After excess PI is removed by a scraper, the PI is cured by heating with hot air to 350° C. to form a pressure-bearing belt. The pressure-bearing belt has a thickness of 7 mm and a width of 40 mm, and a concave-convex structure on one surface.

Through a wrapping machine, a pressure-bearing belt is tiled onto the extruded UHMWPE pipe at 30° with the surface having a concave-convex structure facing outward. Then, a second pressure-bearing belt is engaged, with the surface having a concave-convex structure facing inward, with the wrapped first pressure-bearing belt, so that the two pressure-bearing belts form an interlocking structure, as shown in FIG. 3, which is a CM-type interlocking structure, thereby completing the preparation of the pressure-bearing layer 2.

3. Polybutylene terephthalate (PBT) is extruded outside the wrapped pressure-bearing layer 2 by an extruder using the same process as the extrusion of the inner liner, and shaping and cooling are performed to complete the coating of the first isolation layer 3, with a thickness of 3 mm.

4. After aramid fibers are twisted, an aramid cloth is weaved outside the first isolation layer 3 by a braiding machine. The aramid cloth is immersed in PI, and heat cured to bond into a whole, to improve the internal pressure resistance of the aramid cloth, thereby completing the preparation of the first tensile layer 4, with a thickness of 6 mm.

5. PBT is extruded outside the cured first tensile layer 4 by an extruder using the same process as the extrusion of the inner liner, and shaping and cooling are performed to complete the coating of the second isolation layer 3, with a thickness of 3 mm.

6. After aramid fibers are twisted, an aramid cloth is weaved outside the second isolation layer 3 by a braiding machine. The aramid cloth is immersed in PI, and heat cured to bond into a whole, to improve the internal pressure resistance of the aramid cloth, thereby completing the preparation of the second tensile layer 4, with a thickness of 6 mm.

7. An optical fiber, a cable, and a pressure sensor are wrapped outside the second tensile layer 4 to form the functional layer 5.

8. Thermoplastic polyurethane is extruded through an extruder and coated outside the functional layer 5. Shaping and cooling are performed to complete the processing of the protective layer 6, with a thickness of 6 mm. Finally, pipe collection is carried out by a pipe collecting machine to obtain a finished product.

The non-metallic flexible pipe manufactured in this example can be equivalent to a thick-walled pipe composed of different layers, and according to the stress analysis, the maximum allowable internal pressure of the non-metallic flexible pipe is 40 MPa, and the maximum allowable external pressure is 6 MPa. The polymer materials used in the non-metallic flexible pipe manufactured in this case are all used at a temperature of above 120° C.

The non-metallic flexible pipe can be coiled and its non-destructive axial tension is 550 KN. The flexible pipe can be useful for marine risers and submarine pipelines for oil and gas gathering and transportation under the conditions of the maximum pressure of 35 MPa, a temperature of 120° C., and a water depth of 500 m.

Example 4

This example provides a non-metallic flexible pipe with an inner diameter of 9 inches, sequentially comprising, from the inside to the outside, an inner liner 1, a pressure-bearing layer 2, an isolation layer 3, a tensile layer 4, an isolation layer 3, a tensile layer 4, a functional layer 5, and a protective layer 6. The manufacturing process sequentially includes the following steps:

1. Perfluoroalkoxy (PFA) is extruded by an extruder, and shaped and cooled to obtain a PFA pipe as the inner liner 1. The extrusion process conditions are as follows: an extrusion thickness of 15 mm and an extrusion temperature of 360° C.

2. Carbon fibers are twisted, passed through a die of a pressure-bearing belt, and then immersed in polyimide (PI). After excess PI is removed by a scraper, the PI is cured by heating with hot air to 350° C. to form a pressure-bearing belt. The pressure-bearing belt has a thickness of 10 mm and a width of 40 mm, and a concave-convex structure on one surface.

Through a wrapping machine, a pressure-bearing belt is tiled onto the extruded PFA pipe at 30° with the surface having a concave-convex structure facing outward. Then, a second pressure-bearing belt is engaged, with the surface having a concave-convex structure facing inward, with the wrapped first pressure-bearing belt, so that the two pressure-bearing belts form an interlocking structure, as shown in FIG. 3, which is a CM-type interlocking structure, thereby completing the preparation of the pressure-bearing layer 2.

3. PBT is extruded outside the wrapped pressure-bearing layer 2 by an extruder using the same process as the extrusion of the inner liner, and shaping and cooling are performed to complete the coating of the first isolation layer 3, with a thickness of 3 mm.

4. After aramid fibers are twisted, an aramid cloth is weaved outside the first isolation layer 3 by a braiding machine. The aramid cloth is immersed in PI, and heat cured to bond into a whole, to improve the internal pressure resistance of the aramid cloth, thereby completing the preparation of the first tensile layer 4, with a thickness of 6 mm.

5. PBT is extruded outside the cured first tensile layer 4 by an extruder using the same process as the extrusion of the inner liner, and shaping and cooling are performed to complete the coating of the second isolation layer 3, with a thickness of 3 mm.

6. After aramid fibers are twisted, an aramid cloth is weaved outside the second isolation layer 3 by a braiding machine. The aramid cloth is immersed in PI, and heat cured to bond into a whole, to improve the internal pressure resistance of the aramid cloth, thereby completing the preparation of the second tensile layer 4, with a thickness of 6 mm.

7. An optical fiber, a cable, and a pressure sensor are wrapped outside the second tensile layer 4 to form the functional layer 5.

8. Thermoplastic polyurethane is extruded through an extruder and coated outside the functional layer 5. Shaping and cooling are performed to complete the processing of the protective layer 6, with a thickness of 10 mm. Finally, pipe collection is carried out by a pipe collecting machine to obtain a finished product.

The non-metallic flexible pipe manufactured in this example can be equivalent to a thick-walled pipe composed of different layers, and according to the stress analysis, the maximum allowable internal pressure of the non-metallic flexible pipe is 60 MPa, and the maximum allowable external pressure is 11 MPa.

The non-metallic flexible pipe can be coiled and its non-destructive axial tension is 500 KN. The flexible pipe can be useful for marine risers and submarine pipelines for oil and gas gathering and transportation under the conditions of the maximum pressure of 50 MPa, a temperature of 150° C., and a water depth of 1000 m.

Example 5

This example provides a non-metallic flexible pipe with an inner diameter of 7 inches, sequentially comprising, from the inside to the outside, an inner liner 1, a pressure-bearing layer 2, an isolation layer 3, a tensile layer 4, an isolation layer 3, a tensile layer 4, a functional layer 5, and a protective layer 6. The manufacturing process sequentially includes the following steps:

1. Polyetheretherketone (PEEK) is extruded by an extruder, and shaped and cooled to obtain a PEEK pipe as the inner liner 1. The extrusion process conditions are as follows: an extrusion thickness of 15 mm and an extrusion temperature of 400° C.

2. Carbon fibers are twisted, passed through a die of a pressure-bearing belt, and then immersed in poly (phthalazinone ether sulfone ketone) containing biphenyl moieties (PPBESK). After excess PPBESK is removed by a scraper, the PPBESK is cured by heating with hot air to 370° C. to form a pressure-bearing belt. The pressure-bearing belt has a thickness of 10 mm and a width of 40 mm, and a concave-convex structure on one surface.

Through a wrapping machine, a pressure-bearing belt is tiled onto the extruded PEEK pipe at 30° with the surface having a concave-convex structure facing outward. Then, a second pressure-bearing belt is engaged, with the surface having a concave-convex structure facing inward, with the wrapped first pressure-bearing belt, so that the two pressure-bearing belts form an interlocking structure, as shown in FIG. 3, which is a CM-type interlocking structure, thereby completing the preparation of the pressure-bearing layer 2.

3. PFA is extruded outside the wrapped pressure-bearing layer 2 by an extruder using the same process as the extrusion of the inner liner, and shaping and cooling are performed to complete the coating of the first isolation layer 3, with a thickness of 3 mm.

4. After aramid fibers are twisted, an aramid cloth is weaved outside the first isolation layer 3 by a braiding machine. The aramid cloth is immersed in PPBESK, and heat cured to bond into a whole, to improve the internal pressure resistance of the aramid cloth, thereby completing the preparation of the first tensile layer 4, with a thickness of 8 mm.

5. PFA is extruded outside the cured first tensile layer 4 by an extruder using the same process as the extrusion of the inner liner, and shaping and cooling are performed to complete the coating of the second isolation layer 3, with a thickness of 3 mm.

6. After aramid fibers are twisted, an aramid cloth is weaved outside the second isolation layer 3 by a braiding machine. The aramid cloth is immersed in PPBESK, and heat cured to bond into a whole, to improve the internal pressure resistance of the aramid cloth, thereby completing the preparation of the second tensile layer 4, with a thickness of 8 mm.

7. An optical fiber, a cable, and a pressure sensor are wrapped outside the second tensile layer 4 to form the functional layer 5.

8. Thermoplastic polyurethane is extruded through an extruder and coated outside the functional layer 5. Shaping and cooling are performed to complete the processing of the protective layer 6, with a thickness of 15 mm. Finally, pipe collection is carried out by a pipe collecting machine to obtain a finished product.

The non-metallic flexible pipe manufactured in this example can be equivalent to a thick-walled pipe composed of different layers, and according to the stress analysis, the maximum allowable internal pressure of the flexible pipe is 80 MPa, and the maximum allowable external pressure is 20 MPa.

The non-metallic flexible pipe can be coiled and its non-destructive axial tension is 600 kN. The flexible pipe can be useful for marine risers and submarine pipelines for oil and gas gathering and transportation under the conditions of the maximum pressure of 70 MPa, a temperature of 150° C., and a water depth of 1500 m.

Example 6

This example provides a non-metallic flexible pipe with an inner diameter of 2.5 inches, sequentially comprising, from the inside to the outside, an inner liner 1, a pressure-bearing layer 2, an isolation layer 3, a tensile layer 4, an isolation layer 3, a tensile layer 4, an isolation layer 3, a tensile layer 4, a functional layer 5, and a protective layer 6. The manufacturing process sequentially includes the following steps:

1. Perfluoroalkoxy (PFA) is extruded by an extruder, and shaped and cooled to obtain a PFA pipe as the inner liner 1. The extrusion process conditions are as follows: an extrusion thickness of 20 mm and an extrusion temperature of 400° C.

2. Carbon fibers are twisted, passed through a die of a pressure-bearing belt, and then immersed in poly (phthalazinone ether sulfone ketone) containing biphenyl moieties (PPBESK). After excess PPBESK is removed by a scraper, the PPBESK is cured by heating with hot air to 370° C. to form a pressure-bearing belt. The pressure-bearing belt has a thickness of 10 mm and a width of 40 mm, and a concave-convex structure on one surface.

Through a wrapping machine, a pressure-bearing belt is tiled onto the extruded PFA pipe at 30° with the surface having a concave-convex structure facing outward. Then, a second pressure-bearing belt is engaged, with the surface having a concave-convex structure facing inward, with the wrapped first pressure-bearing belt, so that the two pressure-bearing belts form an interlocking structure, as shown in FIG. 3, which is a CM-type interlocking structure.

A third pressure-bearing belt is taken and tiled on the above pressure-bearing belt at −30°, with the surface having a concave-convex structure facing outward, and then a fourth pressure-bearing belt is wrapped, with a double T-type interlocking structure formed between the fourth pressure-bearing belt and the third pressure-bearing belt.

A fifth pressure-bearing belt is taken and tiled on the above pressure-bearing belt at 30°, with the surface having a concave-convex structure facing outward, and then a sixth pressure-bearing belt is wrapped, with a double T-type interlocking structure formed between the sixth pressure-bearing belt and the fifth pressure-bearing belt.

The above-mentioned six pressure-bearing belts (three pairs in total) together form the pressure-bearing layer 2.

3. PFA is extruded outside the wrapped pressure-bearing layer 2 by an extruder using the same process as the extrusion of the inner liner, and shaping and cooling are performed to complete the coating of the first isolation layer 3, with a thickness of 3 mm.

4. After poly (p-phenylene benzobisoxazole) (PBO) fibers are twisted, a PBO cloth is weaved outside the first isolation layer 3 by a braiding machine. The PBO cloth is immersed in PPBESK, and heat cured to bond into a whole, to improve the internal pressure resistance of the PBO cloth, thereby completing the preparation of the first tensile layer 4, with a thickness of 8 mm.

5. The above steps 3 and 4 are repeated twice in sequence to form a structure with alternate coating of three isolation layers 3 and three tensile layers 4.

6. An optical fiber, a cable, and a pressure sensor are wrapped outside the third tensile layer 4 to form the functional layer 5.

7. Thermoplastic polyurethane is extruded through an extruder and coated outside the functional layer 5. Shaping and cooling are performed to complete the processing of the protective layer 6, with a thickness of 20 mm. Finally, pipe collection is carried out by a pipe collecting machine to obtain a finished product.

The non-metallic flexible pipe manufactured in this example can be equivalent to a thick-walled pipe composed of different layers, and according to the stress analysis, the maximum allowable internal pressure of the flexible pipe is 120 MPa, and the maximum allowable external pressure is 45 MPa.

The non-metallic flexible pipe can be coiled and its non-destructive axial tension is 700 kN. The flexible pipe can be useful for marine risers and submarine pipelines for oil and gas gathering and transportation under the conditions of the maximum pressure of 105 MPa, a temperature of 177° C., and a water depth of 3000 m.

Finally, it should be noted that the foregoing embodiments are merely intended for describing the technical solutions of the present invention rather than limiting the present invention. Although the present invention has been described in detail with reference to the foregoing embodiments, those of ordinary skill in the art should understand that modifications may be made to the technical solutions described in the foregoing embodiments or equivalent substitutions are made to some technical features therein, and these modifications or substitutions do not cause the essence of respective technical solutions to depart from the scope of the technical solutions of the embodiments of the present invention.

What is claimed is:

1. A non-metallic flexible pipe, wherein sequentially comprising, from the inside to the outside, an inner liner, a pressure-bearing layer, an isolation layer, a tensile layer, a functional layer, and a protective layer, with non-rigid bonding being between two adjacent layers, wherein the material of the inner liner is a thermoplastic polymer, the material of the pressure-bearing layer is a fiber-reinforced resin-based composite, the material of the isolation layer is a thermoplastic polymer, the material of the tensile layer is a resin-reinforced fiber, at least one of an optical fiber, a cable, a tracing ribbon, a pipe for conveying a heat transfer medium, a pressure sensor, and a temperature sensor is provided in the functional layer, and the material of the protective layer is a thermoplastic polymer.

2. The non-metallic flexible pipe according to claim 1, wherein the thermoplastic polymer used for the inner liner is an engineering thermoplastic, and the inner liner has a thickness of 1-20 mm.

3. The non-metallic flexible pipe according to claim 1, wherein the pressure-bearing layer is formed by at least one pair of pressure-bearing belts being wrapped on the inner liner successively and extending along an axial direction of the inner liner, wherein in each pair of pressure-bearing belts, an inner surface of the later wrapped pressure-bearing belt covers an outer surface of the first wrapped pressure-bearing belt, and an interlocking structure is formed between the two surfaces, so that relative displacements do not occur between the two pressure-bearing belts in the axial direction.

4. The non-metallic flexible pipe according to claim 3, wherein in each pair of pressure-bearing belts, the pressure-bearing belts wrapped successively are staggered, with inlaid connection being between the two surfaces that contact each other.

5. The non-metallic flexible pipe according to claim 3, wherein the pressure-bearing belt is obtained by twisting fibers into bundles, extruding and impregnating with a resin, and curing the impregnating resin, wherein the pressure-bearing layer has a width of 10-100 mm and a thickness of 1-20 mm.

6. The non-metallic flexible pipe according to claim 1, wherein the tensile layer is a single-layer structure, or a multi-layer structure with non-rigid bonding between the layers, wherein the tensile layer has a thickness of 1-25 mm.

7. The non-metallic flexible pipe according to claim 6, wherein each layer of the tensile layer is formed by coating a fiber cloth woven from fibers on the surface of the isolation layer, impregnating the fiber cloth with a resin, and curing the resin.

8. The non-metallic flexible pipe according to claim 1, wherein the isolation layer and the tensile layer disposed adjacent to each other are set as a group, and 1-3 groups of the isolation layer and the tensile layer are disposed between the pressure-bearing layer and the functional layer.

9. A manufacturing method for the non-metallic flexible pipe according to claim 1, wherein comprising the following steps:

step 1: a thermoplastic polymer is melt-extruded, and shaped and cooled to obtain an inner lining pipe with a preset size as the inner liner;

step 2: two pressure-bearing belts made of a fiber-reinforced resin-based composite are wrapped on a surface of the inner lining pipe successively and extend along an axial direction of the inner lining pipe to form the pressure-bearing layer;

step 3: a thermoplastic polymer is melt-extruded and wrapped on a surface of the pressure-bearing layer, and then shaped and cooled to form the isolation layer;

step 4: fibers are woven onto a surface of the isolation layer, so that a woven fiber cloth is coated on the surface of the isolation layer; the fiber cloth is impregnated with or coated with a resin, and the resin is cured to form the tensile layer;

step 5: at least one of the optical fiber, the cable, the tracing ribbon, the pipe for conveying the heat transfer medium, the pressure sensor, and the temperature sensor is wrapped on a surface of the tensile layer to obtain the functional layer; and step 6: a thermoplastic polymer is extruded outside the functional layer, and shaped and cooled to complete the coating of the protective layer.

10. The manufacturing method for the non-metallic flexible pipe according to claim 9, wherein step 2 is carried out for 1-5 times, wherein the pressure-bearing belt is obtained by twisting fibers into bundles, extruding and impregnating with a resin, and curing the impregnating resin.

11. The non-metallic flexible pipe according to claim 4, wherein the pressure-bearing belt is obtained by twisting fibers into bundles, extruding and impregnating with a resin, and curing the impregnating resin,
wherein the pressure-bearing layer has a width of 10-100 mm and a thickness of 1-20 mm.

12. The non-metallic flexible pipe according to claim 6, wherein the pressure-bearing layer and the functional layer disposed adjacent to each other are set as a group, and 1-3 groups of the pressure-bearing layer and the functional layer are disposed between the pressure-bearing layer and the functional layer.

13. The non-metallic flexible pipe according to claim 7, wherein the pressure-bearing layer and the functional layer disposed adjacent to each other are set as a group, and 1-3 groups of the pressure-bearing layer and the functional layer are disposed between the pressure-bearing layer and the functional layer.

14. A manufacturing method for the non-metallic flexible pipe according to claim 2, wherein comprising the following steps:
step 1: a thermoplastic polymer is melt-extruded, and shaped and cooled to obtain an inner lining pipe with a preset size as the inner liner;
step 2: two pressure-bearing belts made of a fiber-reinforced resin-based composite are wrapped on a surface of the inner lining pipe successively and extend along an axial direction of the inner lining pipe to form the pressure-bearing layer;
step 3: a thermoplastic polymer is melt-extruded and wrapped on a surface of the pressure-bearing layer, and then shaped and cooled to form the isolation layer;
step 4: fibers are woven onto a surface of the isolation layer, so that a woven fiber cloth is coated on the surface of the isolation layer; the fiber cloth is impregnated with or coated with a resin, and the resin is cured to form the tensile layer;
step 5: at least one of the optical fiber, the cable, the tracing ribbon, the pipe for conveying the heat transfer medium, the pressure sensor, and the temperature sensor is wrapped on a surface of the tensile layer to obtain the functional layer; and
step 6: a thermoplastic polymer is extruded outside the functional layer, and shaped and cooled to complete the coating of the protective layer.

15. A manufacturing method for the non-metallic flexible pipe according to claim 3, wherein comprising the following steps:
step 1: a thermoplastic polymer is melt-extruded, and shaped and cooled to obtain an inner lining pipe with a preset size as the inner liner;
step 2: two pressure-bearing belts made of a fiber-reinforced resin-based composite are wrapped on a surface of the inner lining pipe successively and extend along an axial direction of the inner lining pipe to form the pressure-bearing layer;
step 3: a thermoplastic polymer is melt-extruded and wrapped on a surface of the pressure-bearing layer, and then shaped and cooled to form the isolation layer;
step 4: fibers are woven onto a surface of the isolation layer, so that a woven fiber cloth is coated on the surface of the isolation layer; the fiber cloth is impregnated with or coated with a resin, and the resin is cured to form the tensile layer;
step 5: at least one of the optical fiber, the cable, the tracing ribbon, the pipe for conveying the heat transfer medium, the pressure sensor, and the temperature sensor is wrapped on a surface of the tensile layer to obtain the functional layer; and
step 6: a thermoplastic polymer is extruded outside the functional layer, and shaped and cooled to complete the coating of the protective layer.

16. A manufacturing method for the non-metallic flexible pipe according to claim 4, wherein comprising the following steps:
step 1: a thermoplastic polymer is melt-extruded, and shaped and cooled to obtain an inner lining pipe with a preset size as the inner liner;
step 2: two pressure-bearing belts made of a fiber-reinforced resin-based composite are wrapped on a surface of the inner lining pipe successively and extend along an axial direction of the inner lining pipe to form the pressure-bearing layer;
step 3: a thermoplastic polymer is melt-extruded and wrapped on a surface of the pressure-bearing layer, and then shaped and cooled to form the isolation layer;
step 4: fibers are woven onto a surface of the isolation layer, so that a woven fiber cloth is coated on the surface of the isolation layer; the fiber cloth is impregnated with or coated with a resin, and the resin is cured to form the tensile layer;
step 5: at least one of the optical fiber, the cable, the tracing ribbon, the pipe for conveying the heat transfer medium, the pressure sensor, and the temperature sensor is wrapped on a surface of the tensile layer to obtain the functional layer; and
step 6: a thermoplastic polymer is extruded outside the functional layer, and shaped and cooled to complete the coating of the protective layer.

17. A manufacturing method for the non-metallic flexible pipe according to claim 5, wherein comprising the following steps:
step 1: a thermoplastic polymer is melt-extruded, and shaped and cooled to obtain an inner lining pipe with a preset size as the inner liner;
step 2: two pressure-bearing belts made of a fiber-reinforced resin-based composite are wrapped on a surface of the inner lining pipe successively and extend along an axial direction of the inner lining pipe to form the pressure-bearing layer;

step 3: a thermoplastic polymer is melt-extruded and wrapped on a surface of the pressure-bearing layer, and then shaped and cooled to form the isolation layer;

step 4: fibers are woven onto a surface of the isolation layer, so that a woven fiber cloth is coated on the surface of the isolation layer; the fiber cloth is impregnated with or coated with a resin, and the resin is cured to form the tensile layer;

step 5: at least one of the optical fiber, the cable, the tracing ribbon, the pipe for conveying the heat transfer medium, the pressure sensor, and the temperature sensor is wrapped on a surface of the tensile layer to obtain the functional layer; and step 6: a thermoplastic polymer is extruded outside the functional layer, and shaped and cooled to complete the coating of the protective layer.

18. A manufacturing method for the non-metallic flexible pipe according to claim 6, wherein comprising the following steps:

step 1: a thermoplastic polymer is melt-extruded, and shaped and cooled to obtain an inner lining pipe with a preset size as the inner liner;

step 2: two pressure-bearing belts made of a fiber-reinforced resin-based composite are wrapped on a surface of the inner lining pipe successively and extend along an axial direction of the inner lining pipe to form the pressure-bearing layer;

step 3: a thermoplastic polymer is melt-extruded and wrapped on a surface of the pressure-bearing layer, and then shaped and cooled to form the isolation layer;

step 4: fibers are woven onto a surface of the isolation layer, so that a woven fiber cloth is coated on the surface of the isolation layer; the fiber cloth is impregnated with or coated with a resin, and the resin is cured to form the tensile layer;

step 5: at least one of the optical fiber, the cable, the tracing ribbon, the pipe for conveying the heat transfer medium, the pressure sensor, and the temperature sensor is wrapped on a surface of the tensile layer to obtain the functional layer; and step 6: a thermoplastic polymer is extruded outside the functional layer, and shaped and cooled to complete the coating of the protective layer.

19. A manufacturing method for the non-metallic flexible pipe according to claim 7, wherein comprising the following steps:

step 1: a thermoplastic polymer is melt-extruded, and shaped and cooled to obtain an inner lining pipe with a preset size as the inner liner;

step 2: two pressure-bearing belts made of a fiber-reinforced resin-based composite are wrapped on a surface of the inner lining pipe successively and extend along an axial direction of the inner lining pipe to form the pressure-bearing layer;

step 3: a thermoplastic polymer is melt-extruded and wrapped on a surface of the pressure-bearing layer, and then shaped and cooled to form the isolation layer;

step 4: fibers are woven onto a surface of the isolation layer, so that a woven fiber cloth is coated on the surface of the isolation layer; the fiber cloth is impregnated with or coated with a resin, and the resin is cured to form the tensile layer;

step 5: at least one of the optical fiber, the cable, the tracing ribbon, the pipe for conveying the heat transfer medium, the pressure sensor, and the temperature sensor is wrapped on a surface of the tensile layer to obtain the functional layer; and step 6: a thermoplastic polymer is extruded outside the functional layer, and shaped and cooled to complete the coating of the protective layer.

20. A manufacturing method for the non-metallic flexible pipe according to claim 8, wherein comprising the following steps:

step 1: a thermoplastic polymer is melt-extruded, and shaped and cooled to obtain an inner lining pipe with a preset size as the inner liner;

step 2: two pressure-bearing belts made of a fiber-reinforced resin-based composite are wrapped on a surface of the inner lining pipe successively and extend along an axial direction of the inner lining pipe to form the pressure-bearing layer;

step 3: a thermoplastic polymer is melt-extruded and wrapped on a surface of the pressure-bearing layer, and then shaped and cooled to form the isolation layer;

step 4: fibers are woven onto a surface of the isolation layer, so that a woven fiber cloth is coated on the surface of the isolation layer; the fiber cloth is impregnated with or coated with a resin, and the resin is cured to form the tensile layer;

step 5: at least one of the optical fiber, the cable, the tracing ribbon, the pipe for conveying the heat transfer medium, the pressure sensor, and the temperature sensor is wrapped on a surface of the tensile layer to obtain the functional layer; and step 6: a thermoplastic polymer is extruded outside the functional layer, and shaped and cooled to complete the coating of the protective layer.

\* \* \* \* \*